2,828,786

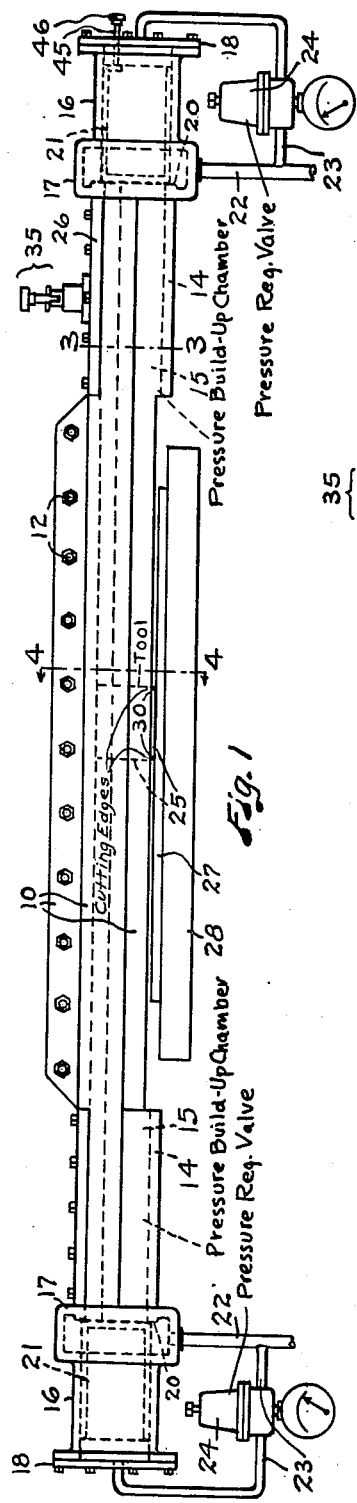
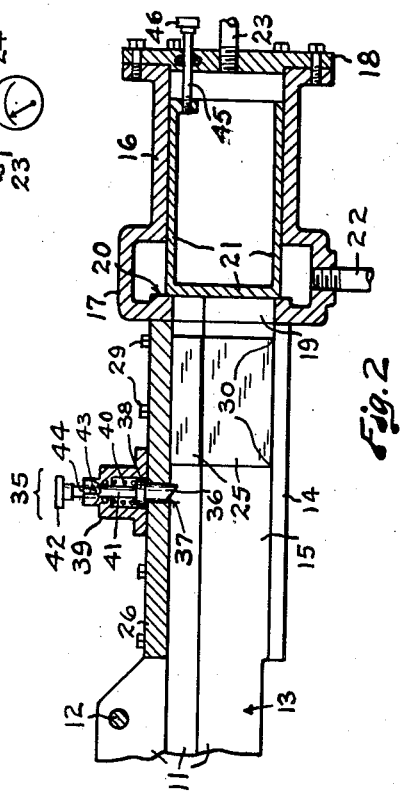
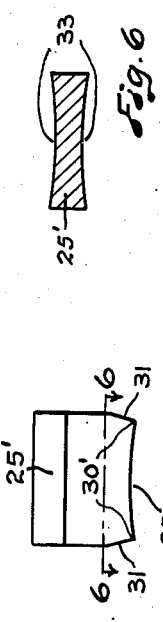
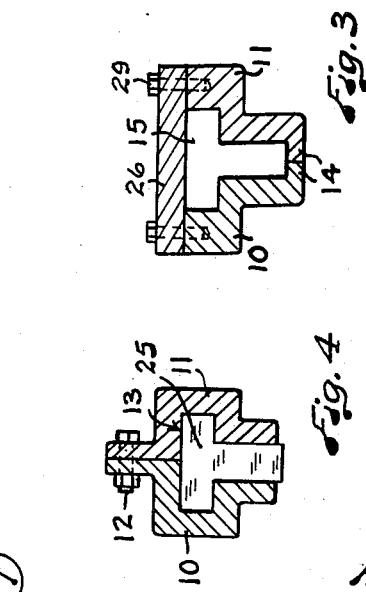
INVENTOR.
*Alfred C. Johnson*
BY
*Fred C. Matheny*
ATTORNEY United States Patent Office 2,828,786
Patented Apr. 1, 1958

PNEUMATICALLY OPERATED FINISHING, CUTTING OR SCRAPING DEVICE

Alfred C. Johnson, Seattle, Wash.

Application December 15, 1955, Serial No. 553,259

12 Claims. (Cl. 144—114)

This invention relates to a pneumatically operated finishing, cutting or scraping device and an object of this invention is to provide a device of this nature in which a tool member capable of doing finishing, cutting, scraping or like work is pneumatically driven back and forth across material being worked on.

Another object is to provide a device of this nature having a tool member which is moved at a very high rate of speed across material on which it is working.

Another object is to provide a pneumatic tool of this type in which a reciprocable tool member is imparted sufficient velocity at the beginning of each stroke to carry it by inertia across material it is working on.

Another object is to provide a pneumatic device of this type in which a tool member is pneumatically propelled at a high rate of speed back and forth across material on which it does work and in which said tool member, as it approaches the end of each stroke, enters within a pressure build up chamber and builds up air pressure that helps to bring the tool member to a stop and opens a valve and releases a blast of high pressure air which reversely moves the tool member on the next succeeding stroke.

Another object is to provide a pneumatic device of this type in which a high velocity reciprocating tool member is brought to a stop gradually and without objectionable shock at each end of each stroke by building up in front of the tool member a cushioning or shock absorbing pressure and in which the rebound of the air thus compressed in stopping the tool member helps to drive said tool member in the opposite direction on the succeeding stroke, thereby conserving energy.

Other objects of this invention will be apparent from the following description taken in connection with the accompanying drawings.

In the drawings Figure 1 is an elevation of a pneumatic tool constructed in accordance with my invention and illustrating, somewhat diagrammatically, material and material feeding means used in connection with the device.

Fig. 2 is a longitudinal medial sectional view on a larger scale than Fig. 1 of one end portion of my tool, parts being shown in elevation.

Fig. 3 is a view in cross section, on a larger scale than Fig. 1, taken substantially on broken line 3—3 of Fig. 1.

Fig. 4 is another view in cross section taken substantially on broken line 4—4 of Fig. 1 and on a larger scale than Fig. 1 and showing a tool member in end elevation.

Fig. 5 is a detached view in side elevation of a tool member of modified form which is used in this device.

Fig. 6 is a sectional view taken substantially on broken line 6—6 of Fig. 5.

Like reference numerals refer to like parts throughout the several views.

This device comprises a straight tool guide of substantial length herein shown as being formed of two mated parts 10 and 11 secured together by bolts or screws 12. The two parts 10 and 11 are shaped so as to provide therebetween a passageway 13 of appproximately T shape, cross sectionally considered, this passageway 13 being open along the bottom throughout the medial portion of the length of the parts 10 and 11. Bottom flanges 14 are provided near each end of the tool guide parts 10 and 11, these bottom flanges being of substantial length and cooperating in forming pressure build-up chambers 15 at the respective ends of the tool guide members.

Air pressure supply and control units of duplicate construction are provided at end end of the tool guide. Each of said units comprises a valve cylinder 16 having an enlarged inner end part 17 which forms a storage chamber or reservoir for highly compressed air. Each valve cylinder 16 has an end plate 18 secured to and closing its outer end. Each cylinder 16 is properly aligned with the tool guide formed by parts 9 and 10 and the enlarged inner end part 17 of each cylinder 16 is rigidly secured to the adjacent end of the tool guide. Also the enlarged inner end 17 of each cylinder 16 is provided with an opening 19 which registers with the T shaped end of the adjacent pressure build-up chamber 15 in the tool guide. The inner end of each cylinder 16 is further provided with a valve seat 20 extending around the opening 19 and positioned within the reservoir formed by the enlarged part 17. A valve piston 21, herein shown hollow cup shape, is movably disposed in each cylinder 16 with its closed end adjacent to and in a position to engage with and seat against the valve seat 20.

An air pressure supply conduit 22 communicates with the air pressure reservoir formed by the enlarged inner end portion 17 of each air cylinder. A by-pass conduit 23, having a pressure regulating valve 24 therein communicatively connects the air pressure supply conduit 22 with the outer end of each cylinder 16. The by-pass conduit 23 and pressure regulating valve 24 provide a means for supplying, to the outer end of each cylinder 16, air at a lower pressure than the air in the conduit 22. Obviously this lower pressure air could be supplied in a different manner.

A tool member 25 of T shaped cross section fits snugly within and is longitudinally movable in the T shaped passageway 13 and pressure build-up chambers 15 of the tool guide 10, 11. The lower edge portion of this T shaped tool member 25 is of suitable hard or cutting material and protrudes far enough below or beyond the non-flanged bottom edge parts of the tool guide members 10 and 11 so that it will engage with the top surface of flat material 27 which is to be worked on. The material 27 is movably supported close to the lower edges of the parts 10 and 11 by work supporting and moving means 28 of conventional construction, such as feed rolls or a feed bed or a work table. This device is well adapted for finishing and smoothing surfaces of plywood, which are ordinarily finished by sanding processes. However it obviously can be used for finishing the surfaces of various other flat materials.

Each lowermost corner 30 of the tool member 25 constitutes a blade or tool edge for doing work on material 27 as the tool member moves at high velocity across the material. Figs. 1 and 2 show corners 30 formed by two flat edges intersecting substantially at right angles to each other. Fig. 5 shows a tool member 25' which is similar to the tool member 25 except that the ends thereof, indicated by 31, and positioned adjacent the corners 30' are beveled or ground so that, downwardly considered, they slope inwardly and will be at a smoothing angle of less than ninety degrees relative to the work toward which they are moving. This back beveling of the end surfaces of the tool 25' makes it possible to provide a smoother surface on some materials than is provided by a tool having edges formed at more abrupt angles. Obviously the bevels 31 can be inclined outwardly instead of inwardly as shown in Fig. 5, in which instance they will have a greater tendency to dig into the material. It will be understood that the tool will be shaped to conform to the requirements of the material being worked on, this disclosure being illustrative of some but not all tools which may be used.

Preferably the top wall of each pressure build-up chamber 15 is in the form of a separable top plate 26 secured to members 10 and 11 by cap screws 29 so that it can be removed to afford access to the interior of the chamber 15.

To help control movement of the tool member 25 and to retain said tool member near one end of its stroke and facilitate starting operation of the device I preferably provide a manually controlled tool member holding device referred to generally by 35 and shown near the right end of the tool guide in Figs. 1 and 2. This device comprises a latch bolt 36 which operates through a hole 37 in the removable cover plate 26 and is positioned far enough inwardly from the end of the adjacent cylinder 16 so that it will lock behind the tool 25 when said tool it at or near the limit of its movement toward that end of the machine. The bolt 36 has a beveled inner end which allows the tool member 25 to move past it as said tool member moves toward the adjacent cylinder 16. Also said bolt 36 has an enlarged part 38 which operates in a housing 39 and limits inward movement of the bolt 36 and provides a shoulder against which a compression spring 40 can press to urge the bolt inwardly. A stem 41 attached to the bolt 36 extends outwardly through the housing and has a knob 42 on its outer end. A cross pin 43 in the stem 41 will allow the bolt 36 to move inwardly and lock behind the tool member 25 when said cross pin 43 is within an upwardly opening slot 44 in a hub on the upper end of the housing 39, as shown in Fig. 2. When the stem 41 is lifted far enough and rotatively moved the pin 43 will rest on a part of this hub far enough above the bottom of the slot 44 so that the bolt 36 will be clear of the tool member 25.

To make possible manual retraction of each piston 21 and thus facilitate starting reciprocation of the tool member 25 I preferably attach to one of said pistons 21 a rod 45 which extends outwardly through suitable packing in the adjacent cylinder end 18 and has a finger piece 46 on its outer end. The finger piece 46 can be grasped to pull the piston 21 off of its seat 20 and admit a starting blast or charge of air into the adjacent pressure build-up chamber 15.

When this device is in operation the tool member 25 will be reciprocating at high speed back and forth between the two pressure build-up chambers 15. At the same time material, such as plywood, which is to have its surface smoothed or otherwise worked on will be moving transversely past the tool guide 10, 11 with the material firmly supported on and by the material feeding means 28 and with the uppermost surface of the material maintained in a proper position for engagement thereof by the edges 30 of the tool member so that said edges 30 will finish or smooth or otherwise work on the material. The tool member 25 moves at high speed across the material and the rate of travel of the material is adjusted so that the material advances an amount less than the width of the cutting or smoothing part of the tool member during the time the tool member is making each complete stroke from one end to the other of the tool guide. Thus danger of skipping surface areas is avoided and all surface parts are properly finished.

The tool member 25 fits snugly enough in the pressure build-up chambers 15 so that there will not be an objectionable amount of air pass between said tool member and the walls of the chambers 15. The plane of the upper or inside surfaces of the flanges 14 is a short distance below the plane of the lower edges of the parts of the guide members 10 and 11 under which the material passes. This makes possible exposure of the bottom edge of the tool member 25 between the ends of the two pressure build-up chambers 15 for working on the material while it is traveling between the two chambers 15. Also it makes possible efficient air sealing of the bottom edge of the tool member within the air pressure build-up chambers 15.

Usually reciprocation of the tool member 25 is stopped by releasing the latch member or bolt 36 and shutting off the supply of compressed air supplied by conduits 22. This will ordinarily stop the tool member 25 in the the pressure build-up chamber with which the latch means 35 is associated and close to a piston 21, as shown in Fig. 2. One way to start reciprocation of the tool member from this position is to manually retract the latch 36 and lock the same retracted, then, while both piston valves 21 are against their seats 20, admit air under pressure to both air supply conduits 22, then manually retract the valve piston 21 adjacent the tool member 25 by exerting a sharp pull on the rod 45 and instantly releasing said rod. The burst of high pressure air released against the tool member 25 by the unseating of the valve piston 21 will propel said tool member at high velocity toward the opposite end of the tool guide and into the other pressure build-up chamber. The air back of the tool member 25 exhausts the instant the tool member is clear of the flanges 14 and the resulting drop in pressure allows the lower pressure air against the outer end of the valve piston to close said valve piston against its seat 20. As the tool member moves at high velocity into the other pressure build-up chamber 15 the air pressure in front of its increases until this built up air pressure opens the other valve piston 21 toward which the tool member 25 is moving and releases a burst of high pressure air to drive the tool member back across the material and into the opposite pressure build-up chamber 15 where the procedure is repeated. The build up of pressure between the tool member 25 and a valve piston 21 as the tool member moves into one of the pressure build-up chambers 15 cushions and tends to stop movement of the tool member and opens the valve piston 21 to provide a burst of high pressure air which reverses movement of the tool member and drives it in the other direction. The energy used at each stroke in building up the pressure which slows down and cushions the impact of the tool member is not lost because expansion of the air thus compressed helps impart momentum to the tool member in the opposite direction on the next stroke. Because the tool member 25 moves at a very high rate of speed it can contact the material lightly and will provide an excellent finish thereon.

The foregoing description and accompanying drawings disclose a preferred embodiment of my invention but it will be understood that changes may be made within the scope of the following claims.

I claim:

1. The method of finishing a flat surface of moving material, which comprises pneumatically reciprocably propelling a tool member at high speed back and forth across the material with the tool member contacting the surface of the moving material and moving substantially transversely to the direction of movement of the material and at a speed which completes each stroke of the tool while the material is moving a distance less than the width of the tool.

2. In a pneumatic tool, a substantially straight tool guide; two spaced apart aligned pressure build-up chambers provided at the respective end portions of said tool guide; air pressure supply means connected with each pressure build-up chamber; and a tool reciprocably guided by said tool guide and said pressure build-up chambers and reciprocably pneumatically driven between said chambers.

3. In a pneumatic tool, two spaced apart aligned pressure build-up chambers having a work space therebetween; a substantially straight tool guide extending across said work space between said pressure build-up chambers; work supporting means adjacent said tool guide; a tool member guided by said tool guide for reciprocating movement across said work space between said two chambers; and air pressure supply means connected with each air pressure build-up chamber.

4. A pneumatic tool comprising a straight tool guide of substantial length having an air pressure build-up chamber formed in each end portion thereof; a pneumatically driven tool member movable longitudinally in said tool guide and said chambers and having a material contacting part protruding from the portion of the tool guide between the chambers; and air pressure supply means connected with the respective chambers delivering bursts of air under pressure against said tool member each time the tool member enters one of the chambers reciprocating said tool member at high velocity across the portion of said tool guide between the chambers.

5. A pneumatic tool comprising a straight tool guide of substantial length having an air pressure build-up chamber formed in each end portion thereof; a pneumatically driven tool member movable longitudinally in said tool guide and said chambers and having a material contacting part protruding from the portion of the tool guide between the chambers; material supporting and moving means positioned adjacent to said tool guide supporting flat material for movement in the path of the material contacting part of the tool member; and air pressure supply means connected with the respective chambers delivering bursts of air under pressure against said tool member each time the tool member enters one of the chambers reciprocating the tool member at high velocity across the portion of the tool guide means adjacent which material is supported.

6. The apparatus as claimed in claim 5 in which an air control valve in each air pressure supply means is opened by pressure built up by the tool member in the adjacent air pressure build-up chamber and releases air reversely driving said tool member.

7. The apparatus as claimed in claim 5 in which the tool guide is open along the bottom between the two pressure build-up chambers providing exhaust of air from said chambers, and in which the material contacting part of the tool member protrudes from the opening along the bottom of the tool guide in contacting the material.

8. The apparatus as claimed in claim 5 in which the interior of the tool guide is T shape in cross section and open along its bottom between the two pressure build-up chambers and the tool member is T shape in cross section with its material contacting portion protruding from the open bottom of the tool guide.

9. In a pneumatic tool, a straight tool guide of substantial length having a longitudinally extending bottom opening terminating short of both ends of said tool guide forming a pressure build-up chamber in each end of said tool guide; a tool member reciprocable longitudinally in said tool guide and said chambers, said tool member having a material engaging part protruding from said bottom opening engaging material positioned externally of said tool guide; a valve cylinder connected with each end of said tool guide outwardly from the pressure build-up chamber therein and communicating with the pressure build-up chamber, the inner end portion of each cylinder having an enlarged storage chamber for air under pressure and having a valve seat positioned between said air storage chamber and the adjacent air pressure build-up chamber; an air pressure supply conduit connected with each air pressure storage chamber; and a piston valve movable in each valve cylinder into and out of engagement with the adpjacent valve seat, said valves being movable away from said seats by pressure built up in said pressure build-up chambers.

10. The apparatus as claimed in claim 9 in which piston valve retracting means is connected with one of said piston valves and is operable from the exterior of the cylinder containing the valve.

11. The apparatus as claimed in claim 9 in which tool member holding means provided in connection with at least one of said pressure build-up chambers is operable from the exterior of the chamber in blocking retractile movement of the tool member.

12. The apparatus as claimed in claim 9 in which a second air pressure supply means is connected with the outer end of each valve cylinder supplying compressed air at lower pressure than the air supplied by said first named air pressure supply means against the side of the piston valve outwardly from the valve seat.

References Cited in the file of this patent

UNITED STATES PATENTS

| 503,665 | Kelly | Aug. 22, 1893 |
| 893,393 | Smith | July 14, 1908 |
| 2,124,386 | Malam | July 19, 1938 |

FOREIGN PATENTS

| 24,162 | Finland | Sept. 29, 1950 |